G. E. HOLMES AND J. M. AND A. G. BOSTROM.
WINDSHIELD WEATHER SEAL.
APPLICATION FILED SEPT. 29, 1921.

1,418,305.  
Patented June 6, 1922.

WITNESSES  
M. E. Downey  
C. L. Haal

INVENTORS  
Gustav E. Holmes,  
John M. Bostrom,  
Axel G. Bostrom,  
By R. S. Caldwell  
ATTORNEY

UNITED STATES PATENT OFFICE.

GUSTAV E. HOLMES, JOHN M. BOSTROM, AND AXEL G. BOSTROM, OF MILWAUKEE, WISCONSIN.

WINDSHIELD WEATHER SEAL.

1,418,305.      Specification of Letters Patent.      Patented June 6, 1922.

Application filed September 29, 1921. Serial No. 504,205.

*To all whom it may concern:*

Be it known that we, GUSTAV E. HOLMES, JOHN M. BOSTROM, and AXEL G. BOSTROM, citizens of the United States, and residents of Milwaukee, in the county of Milwaukee and State of Wisconsin, have invented new and useful Improvements in Windshield Weather Seals, of which the following is a description, reference being had to the accompanying drawings, which are a part of this specification.

The invention relates to a device for forming a weather-seal between the windshield and the front side-curtain of an automobile.

The object of the invention is to provide an attachment for the windshield of an automobile to which the front edge of the front side-curtain is attached in a weather-proof manner, and which also forms a weather-strip for the windshield.

The invention further consists in the several features hereinafter set forth and more particularly defined by claims at the conclusion hereof.

Figure 1:
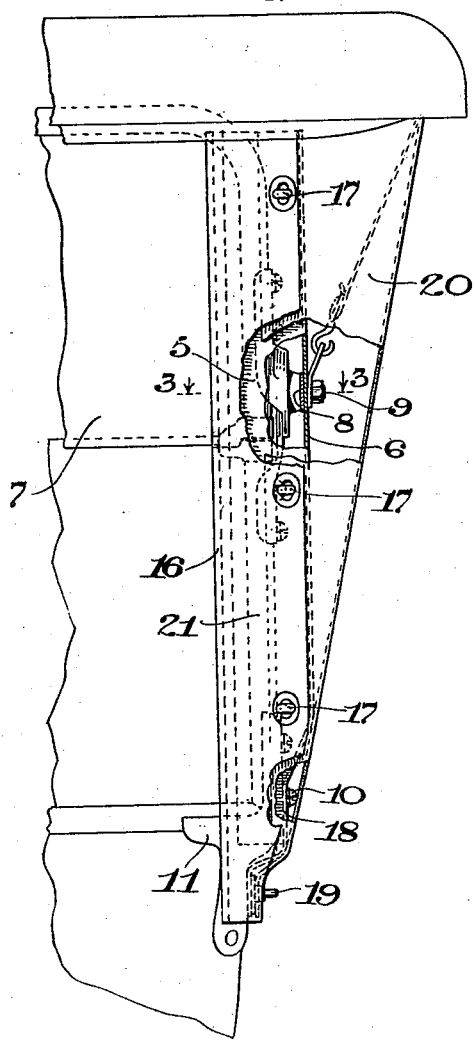
Figure 2:
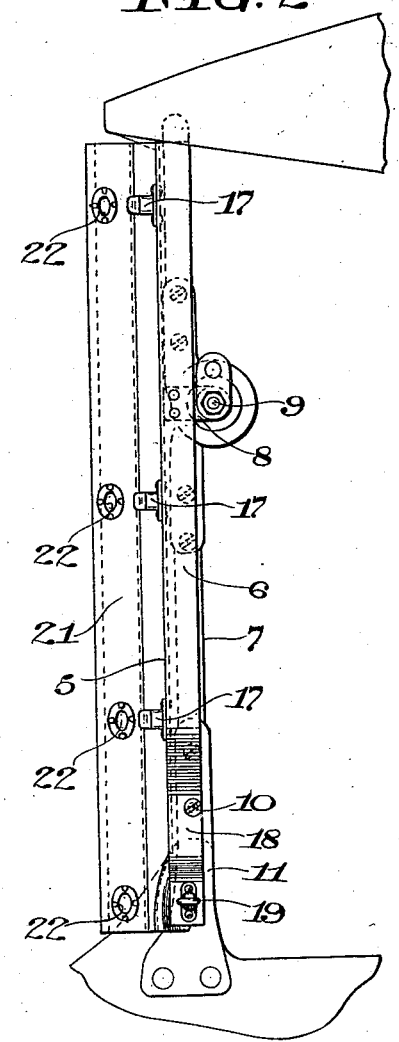
Figure 3:
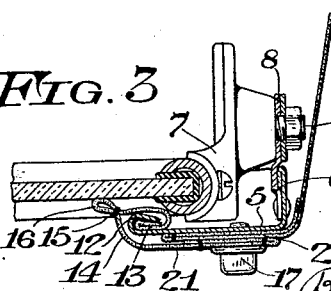

In the drawings: Fig. 1 is a front view of a device embodying the invention, applied to an automobile, parts being broken away and parts being shown in section; Fig. 2 is a side view of the device, and Fig. 3 is a section taken on the line 3—3 of Fig. 1.

The device includes a sheet metal frame 5 having a side flange 6, the frame forming an angular corner-piece which is secured to the frame of the windshield 7 by means of an ear 8 on the side flange 6 through which the pivot bolt 9 of the windshield passes and by means of one of the fastening screws 10 for the windshield bracket 11, which screw passes through a hole in said side flange.

The side of that portion of the frame 5 disposed in front of the windshield is provided with a flanged edge 12 and a bent-over edge 13 of a sealing strip 14 of suitable material, such as curtain fabric, is crimped between this flange 12 and the adjacent part of the frame 5.

This strip 14 extends around the flanged edge 12 and over the front side of the frame 5 and is doubled on itself and stitched at 15 to form a longitudinally extending weather-strip 16 engaging the glass portion of the windshield to prevent wind, rain or snow from passing into the interior of the automobile.

The front side of the frame 5 is provided with curtain fasteners 17 and the lower end 18 of the flange 6 with a curtain fastener 19. This lower end 18 is bent inwardly to lie close to the windshield bracket 11. The front edge of the front curtain 20 is provided with eyelets to fit on the fasteners 17 and 19 and extends over the front side of the frame. That portion 21 of the strip 14 which extends over the front side of the frame 5 forms a sealing flap for the front edge of the curtain 20 as it extends over the edge of said curtain and is secured in position by the fasteners 17 and 19 and cooperative eyelets 22 on said flap.

Each side of the windshield is provided with one of these attachments and it will be noted that the sealing strip 16 and the sealing flaps 21 form an efficient weather-seal about the corners of the windshield. The device is shown as attached to a Ford automobile in which the upper section of the windshield opens inwardly.

We desire it to be understood that this invention is not to be limited to any specific form or arrangement of parts except in so far as such limitations are specified in the claims.

What we claim as our invention is:

1. In a device of the character described, the combination of a metal frame secured to the windshield, a sealing strip secured to said frame and having a weather-strip portion engaging the windshield, and a sealing flap portion for the front edge of the front curtain, said frame having curtain fasteners to which the front edge of the front curtain is secured between the frame and said flap.

2. In a device of the character described, the combination of a metal frame detachably secured to the pivot bolt and base bracket of the windshield, a sealing strip secured to said frame and having a weather-strip portion engaging the windshield and the sealing flap portion for the front edge of the front curtain, said frame having curtain fasteners to which the front edge of the front curtain is secured between the frame and said flap.

3. In a device of the character described, the combination of a metal frame secured to the windshield, a sealing strip secured to the inner edge of said frame and extending around in front of the same, said strip having a weather-strip portion engaging the windshield and a sealing flap portion for the front edge of the front curtain, said frame having curtain fasteners to which the front edge of the front curtain and said flap are secured, the front curtain being secured between the frame and said flap.

4. In a device of the character described, the combination of a metal frame secured to the windshield and having a flanged inner edge, a longitudinally extending sealing strip having one edge clamped between said flange and the body portion of said frame, and a portion extending laterally into engagement with the windshield to form a weather-strip, and another portion forming a sealing strip for the front edge of the front curtain, said frame having curtain fasteners to which the front edge of the front curtain and the sealing flap portion of said strip are secured.

In testimony whereof, we affix our signatures.

GUSTAV E. HOLMES.
JOHN M. BOSTROM.
AXEL G. BOSTROM.